United States Patent [19]

Geurtsen

[11] 4,102,787

[45] Jul. 25, 1978

[54] APPARATUSES TO SEPARATE MIXTURES OF LIQUIDS OF DIFFERENT SPECIFIC GRAVITIES

[75] Inventor: Alfonsus Antonius Geurtsen, Schalkhaar, Netherlands

[73] Assignee: Machinefabriek Geurtsen Deventer, B.V., Deventer, Netherlands

[21] Appl. No.: 705,924

[22] Filed: Jul. 16, 1976

Related U.S. Application Data

[63] Continuation of Ser. No. 548,905, Feb. 11, 1975, abandoned.

[30] Foreign Application Priority Data

Feb. 18, 1974 [NL] Netherlands .......................... 7402216

[51] Int. Cl.$^2$ ............................................. B01D 21/24
[52] U.S. Cl. ..................................... 210/104; 210/109; 210/540
[58] Field of Search .................... 210/104, 86, 540; 61/101

[56] References Cited

U.S. PATENT DOCUMENTS

| 2,537,246 | 1/1951 | Thorensen ....................... 210/86 X |
| 2,872,935 | 2/1959 | Kenney ............................ 210/104 X |
| 2,947,437 | 8/1960 | Greer ................................ 61/101 |
| 3,279,604 | 10/1966 | Leviel ............................. 210/104 X |
| 3,628,660 | 12/1971 | In't Veld ......................... 210/540 |
| 3,957,638 | 5/1976 | In't Veld ......................... 210/104 |

Primary Examiner—Theodore A. Granger
Attorney, Agent, or Firm—John P. Snyder

[57] ABSTRACT

An apparatus to separate a mixture of liquids of different specific gravities, e.g. oil and water, said apparatus having in a closed vessel a separation space with a movable wall portion for controlling the discharge of lighter liquid therefrom, said wall portion being operated by the lighter liquid collecting in said separation space and being a diaphragm or a bellows.

5 Claims, 1 Drawing Figure

U.S. Patent  July 25, 1978  4,102,787
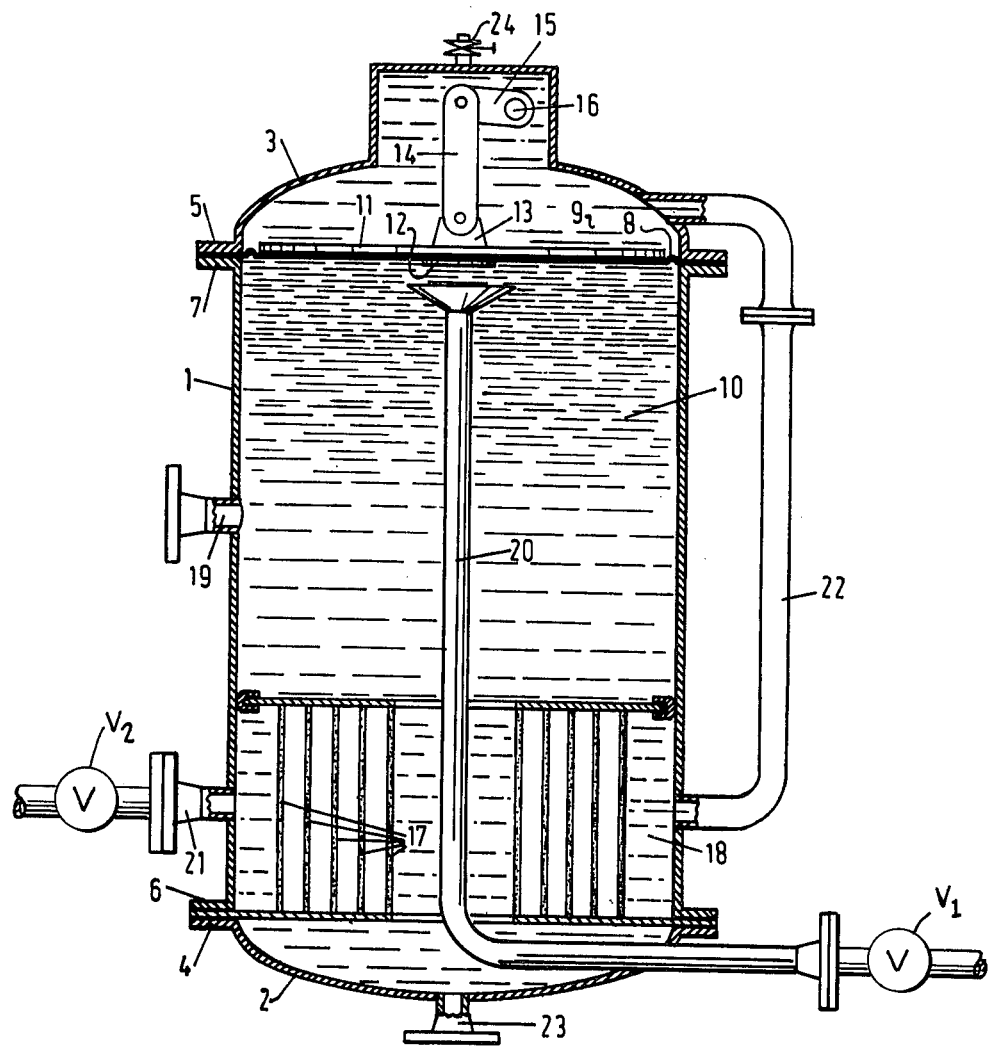

ial area has a bigger separation space, that means
APPARATUSES TO SEPARATE MIXTURES OF LIQUIDS OF DIFFERENT SPECIFIC GRAVITIES This is a continuation of application Ser. No. 548,905, filed Feb. 11, 1975, now abandoned.

The invention relates to an apparatus to separate a mixture of liquids of different specific gravities, e.g. oil and water, said apparatus comprising a closed vessel containing a separation space, an upper chamber situated above said separation space, a partition mounted for vertical movement between a lowest and a highest position to control a regulating and/or signalling device, said partition separating the upper part of said separation space from said upper chamber, a conduit for the supply of mixture to be separated opening into the separation space, a conduit for the discharge of the lighter liquid connected to the separation space, a collecting chamber for the heavier liquid situated under the separation space and provided with a discharge conduit, at least one filter provided between the lower part of the separation space and said collecting chamber and letting through almost exclusively the heavier liquid and a bypass for the interconnection of the lower part of the separation space and said upper chamber.

A separating apparatus, e.g. an oil separator, of this kind has been disclosed in the Dutch patent application No. 67.03838 laid open for public inspection. In this known apparatus the vertically movable partition provided between the separation space and the upper chamber consists of the upper wall of a bell which is mounted for up and down movement in the vessel and contains the separation space. Such a bell is an expensive element of the apparatus. Furthermore it has the disadvantage that it must have a great height in order to prevent that the layer of lighter liquid or oil growing gradually thicker within the bell pushes mixture across the lower edge of the bell, whereafter said mixture reaches the upper chamber through the space which extends radially outside the bell and acts as a bypass. It has appeared, that in order to obtain a reproducible control of the separating apparatus the composition of the liquid contained in the upper chamber and in the bypass-space must be constant and that only then a reliable control is possible, when the upper chamber and the bypass-space contain heavier liquid or pure water only. Should a high bell not be used the danger exists that the apparatus becomes gradually deranged. In order to keep down this derangement the upper chamber and the bypass-space must be flushed now and then with heavier liquid or pure water. Moreover, the relatively high bell requires that for its disassembly a rather high free space is available above so beneath the vessel or that the entire vessel can be removed from the installation. This is a disadvantage, especially for oil separators on board ships.

The invention has the aim to provide a separating apparatus of the described type, in which the disadvantages of the known apparatus are avoided. This is achieved in that the vertically movable partition provided between the separation space and the upper chamber is a diaphragm or a bellows which is attached to the wall of the vessel in a liquid tight manner. Consequently, the bell of the known separating apparatus is replaced by a diaphragm or a bellows. Such a diaphragm or bellows has a considerably simpler and cheaper construction than a bell. The partition consisting of a diaphragm or a bellos requires in vertical direction hardly any space, so that for the disassembly thereof little additional space is required above the vessel. The separation space has the same horizontal dimensions as the vessel, so that a vessel of given cross-sectional area has a bigger separation space, that means a greater capacity than a separating apparatus comprising a bell.

Should a diaphragm for control purposes be used, it could be constructed in a cheap manner, when the diaphragm is made from very pliable material and a rigid plate which extending to near the wall of the vessel is provided on the diaphragm. This plate serves to increase the force required for the control operation and produced by the diaphragm. The plate may be attached to the diaphragm but this is not always necessary. In some cases the weight of the plate is used for resetting the control device, after a predetermind quantity of lighter liquid has been discharged from the separation space.

The diaphragm or the bellows constitutes a liquid tight separation between the separation space extending throughout the entire horizontal cross-sectional area of the vessel and the upper chamber, so that for the communication between said space and said chamber an individual bypass must be provided. This makes it possible to provide the bypass between the collecting chamber and the upper chamber. This has the advantage that the filter consisting of one or more filter elements mounted one after the other is placed between the separation space and the upper chamber, so that heavier liquid contaminated by lighter liquid, say water polluted by oil, cannot arrive in the upper chamber. This is an important improvement in respect of the known separation apparatus provided with a bell.

The invention will be further illucidated with the aid of the drawing which illustrates, by way of example, a vertical sectional view of a separating apparatus according to the invention.

In the drawing 1 is a closed vessel with a detachable bottom 2 and a detachable upper wall 3. The bottom 2 and the upper wall 3 are connected by flanges 4, 5 to flanges 6, 7 provided at the ends of the cylindrical wall of the vessel 1.

Clamped between the flanges 5 and 7 is a diaphragm 8 of very pliable material which separates an upper chamber 9 contained in the vessel from a separation space 10 in a liquid tight manner. Placed on top of the diaphragm 8 is a rigid plate 11 which extends to near the wall of the vessel and is attached to the diaphragm in a small central area only. To that end the diaphragm is clamped between the plate 11 and a plate 12 of relatively small diameter. The plate 11 is provided in the centre with lugs 13 and by means thereof it is connected to a link 14. At its upper end this link is pivotally coupled with a substantially horizontal arm 15 which is attached to a rotatable horizontal shaft 16 extending through the upper wall 3 and used for controlling the process or for signalling a certain condition in the separation space.

Provided beneath the separation space 10 is a space containing a plurality of concentrical filter cloths 17 which are placed between the separation space 10 and a collecting chamber 18.

A conduit 19 for the supply of mixture to be separated, e.g. a mixture of oil and water, opens into the separation space. A conduit 20 for the discharge of lighter liquid, say oil, from said mixture is connected to said space. The entrance of the discharge conduit 20 is situated just below the lowest position of the diaphragm 8. A conduit 21 for the discharge of heavier liquid, say water, from said mixture is connected to the collecting chamber 18. Since the filters let through almost exclusively the heavier liquid, the collecting chamber 18 will contain practically pure heavier liquid or water. The collecting chamber 18 communicates through a bypass 22 with the upper chamber 9. The lowest point of the bottom 2 of the vessel is provided with a conduit 23 for the discharge of sludge. Normally the sludge discharge conduit is closed (not shown).

Before the separating process of a mixture which may consist of water and oil, is started, the vessel 1, 2, 3 is entirely filled with water, for instance through the water discharge conduit 21. To that end a normally closed vent 24 is opened. After the vessel has been completely filled with water the mixture to be separated is supplied through conduit 19, while the valve $V_1$ for the oil discharge conduit 20 is kept closed and the valve $V_2$ in the conduit 21 for the discharge of water is opened. In the separation space 10 the two components of the mixture are separated. In said space the oil moves upwards and it is collected just under the diaphragm 8, whereas the water passes through the filters 17 and thereafter comes into the collecting chamber 18, from where it is discharged through the conduit 21.

After a layer of oil predetermined thickness has been formed under the diaphragm, the latter is pushed upwards by the lighter oil and due thereto the shaft 16 is rotated through a certain angle by means of the mechanical coupling members 11, 13, 14, 15. This rotation of the shaft 16 may set a signalling device in operation, which then gives a warning that oil must be discharged through conduit 20 from the separation space 10. However, the shaft 16 may also act directly on the normally closed valve $V_1$ provided in conduit 20, so that the upward movement of the diaphragm opens said valve.

After a certain quantity of oil has been discharged from the separation space 10 the oil discharge conduit valve $V_1$ is closed again either by hand or automatically, so that the cycle can be started again. The regulation which is effected by the up and down movement of the diaphragm is very stable and can be exactly adjusted, since the water contained in the upper chamber 9, the bypass 22 and the collecting chamber 18 remains pure and owing thereto has a constant specific gravity.

What I claim is:

1. An apparatus to separate a mixture of non-miscible liquids of different specific gravities, e.g. oil and water, said apparatus comprising a closed vessel, a flexible diaphragm forming a partition within said vessel to provide a separation space in said vessel below said diaphragm and an upper chamber in said vessel above said diaphragm and said separation space and intended to be entirely filled, during operation, with the heavier liquid component of the mixture, said flexible diaphragm being mounted for vertical movement in said vessel between two end positions for controlling the flow of liquids through the apparatus a conduit for the supply of mixture to be separated opening into the separation space, a conduit for the discharge of lighter liquid connected to the separation space on a level just below the lowest position of the partition, a discharge conduit for the heavier liquid connected to the lower portion of said vessel and at least one filter provided between the lower part of the separation space and said discharge conduit to provide a collecting chamber for the heavier liquid between said filter and said discharge conduit, said filter being capable of letting through almost exclusively the heavier liquid, said diaphragm being imperforate and being attached in a liquid tight manner to the wall of the vessel thereby preventing said direct communication between said separating space and said upper chamber, and a pipe connecting the upper chamber with the collecting chamber whereby the separation space communicates with the upper chamber only through said filter.

2. Apparatus for separating two non-miscible liquids having different specific gravities, comprising in combination:

a closed vessel having upper and lower ends;

a horizontally disposed and imperforate flexible diaphragm attached in fluid tight relation to said vessel adjacent said upper end thereof and defining a partition within said vessel separating the interior thereof into an upper chamber above the diaphragm and a settling chamber below said diaphragm;

first discharge conduit means connected to the lower portion of said vessel for discharging said heavier liquid from the vessel and an annular filter provided between the lower part of said settling chamber and said first discharge conduit means to define a collecting chamber with which said first discharge conduit means directly communicates, said filter passing almost exclusively said heavier liquid;

inlet means connected to said vessel for introducing a mixture of said liquids into said settling chamber whereby the lighter of said liquids accumulates beneath and contacts said diaphragm on its underside;

a bypass conduit connecting said upper chamber with said collcting chamber whereby to allow said heavier liquid to fill said upper chamber above said diaphragm and thereby contact its upper side and to permit flow of said heavier liquid back and forth between said upper chamber and said collection chamber only through said filter in response to flexing of said diaphragm;

second discharge conduit means communicating with said settling chamber for discharging the lighter of said liquids from said vessel, said second discharge conduit means having an inlet mouth disposed below but close to said diaphragm and a normally closed valve which permits the volume of the lighter of said liquids to build up within said settling chamber;

a plate acting on said diaphragm normally urging it downwardly; and linkage means movable in response to upward flexing of said diaphragm for establishing when said normally closed valve is to be opened for decreasing the volume of said lighter liquid in said settling chamber.

3. Apparatus as defined in claim 2 wherein said vessel comprises a cylindrical main body portion, an upper end wall which is removably secured to the upper end of said main body portion with the periphery of said diaphragm sandwiched therebetween, and a removable lower end wall secured to the lower end of said main body portion, said annular filter being slip-fitted into said lower end of the main body portion.

4. Apparatus for separating two non-miscible liquids having different specific gravities, comprising in combination:

a closed vessel having partition means comprising a flexible, imperforate diaphragm connected in fluid tight relation to said vessel for defining an upper chamber above the diaphragm and a settling chamber below the diaphragm which is isolated from said upper chamber, and having filter means spaced below said diaphragm for defining a collection chamber for the heavier of the liquids which is spaced below said upper chamber, said filter means including at least one filter element capable of letting through almost exclusively the heavier liquid and separating said settling chamber from said collecting chamber;

first conduit means communicating with said settling chamber well below said diaphragm for introducing the two liquids into said settling chamber whereby said heavier liquid settles toward said filter means while the lighter liquid rises toward and contacts the underside of said diaphragm;

second conduit means communicating with said collection chamber for withdrawing said heavier liquid from the apparatus;

third conduit means for withdrawing said lighter liquid from the settling chamber and including a withdrawal inlet for the lighter liquid which is located immediatelybelow said diaphragm;

said diaphragm being vertically movable in said vessel;

a bypass conduit connecting said upper chamber with said collection chamber whereby said upper chamber communicates with the lower part of said settling chamber only through said collection chamber and said filter and is filled with said heavier liquid in contact with the upper side of said diaphragm and said diaphragm rises in response to increasing accumulation of said lighter liquid in the settling chamber and falls in response to diminution of the accumulation of lighter liquid in said settling chamber;

said third conduit means including a normally closed valve for controlling withdrawal of said lighter liquid accumulated in said settling chamber; and means responsive to the rise of said diaphragm for opening said valve only when a quantity of said lighter fluid has accumulated in said settling chamber whereby to avoid contamination of said lighter liquid by said heavier liquid as withdrawn through said third conduit means.

5. Apparatus as defined in claim 4 wherein said valve comprises a closure member carried by said diaphragm and engageable with said inlet of the third conduit means when said diaphragm falls to a selected level within the vessel.

* * * * *